United States Patent
Ogawa

[11] Patent Number: 5,426,596
[45] Date of Patent: Jun. 20, 1995

[54] COLOR SIGNAL CORRECTION CIRCUIT USING A SECOND-ORDER CORRECTING FORMULA

[75] Inventor: Nobuo Ogawa, Kawasaki, Japan

[73] Assignee: Fujitsu Limited, Kawasaki, Japan

[21] Appl. No.: 130,181

[22] Filed: Oct. 1, 1993

[30] Foreign Application Priority Data

Oct. 2, 1992 [JP] Japan ................. 4-264739

[51] Int. Cl.$^6$ ................. G03F 3/00
[52] U.S. Cl. ................. 364/571.01; 364/526; 358/515; 358/518; 358/523
[58] Field of Search ......... 358/518, 523, 515, 501; 364/571.01, 526

[56] References Cited

U.S. PATENT DOCUMENTS 5,311,332 5/1994 Imao et al. ................. 358/523 X

FOREIGN PATENT DOCUMENTS

| 61-111071 | 5/1986 | Japan . |
| 61-139166 | 6/1986 | Japan . |
| 2-007671 | 1/1990 | Japan . |
| 2-044971 | 2/1990 | Japan . |
| 3-066288 | 3/1991 | Japan . |

*Primary Examiner*—Emanuel T. Voeltz
*Assistant Examiner*—Kamini Samjiv Shah
*Attorney, Agent, or Firm*—Staas & Halsey

[57] ABSTRACT

An object of the present invention is to realize a color correction circuit according to a second order color correction formula in which capacities of memories and an operation time are further reduced. A color correction circuit includes three latches, four memories for dividedly storing correction values, and an adder. A first memory receives first and second color separation signals and a color selection signal as address signals. A second memory receives second and third color separation signals and a color selection signal as address signals. A third memory receives third and first color separation signals and the color selection signal as address signals. A value of a product term of the first and second color separation signals is included in the value of the first memory. A value of a product term of the second and third color separation signals is included in the value of the second memory. A value of a product term of the third and first color separation signals is included in the value of the third memory. Values of linear terms and square terms of respective color separation signals are included in memories to which related color separation signals are input.

6 Claims, 6 Drawing Sheets

COLOR SIGNAL CORRECTION CIRCUIT USING A SECOND-ORDER CORRECTING FORMULA

BACKGROUND OF THE INVENTION (1) Field of the Invention

The present invention relates to a color signal correction circuit used in an apparatus for processing a color signal, and particularly, relates to a color signal correction circuit which quickly corrects a color signal according to a second-order color correction formula.

(2) Description of the Related Art

In recent years, as Desk-Top Publishing (DTP) systems, multi-media systems, etc., have been widely used, low-level computers such as personal computers have been used to process color image data. Further, the number of color copiers and color facsimiles in use is increasing, therefore, demand for color image scanners and color printers will increase.

Color image scanners which output R, G and B signals each with more than 256 gradation levels respectively and color printers which can produce more than 16 million colors, by combining inks of Cyan, Magenta, Yellow and Black are now available. When color images are reproduced by using these apparatuses, color drifts are generated due to differences between the characteristics of the respective apparatuses.

For example, in a color image scanner, an original image is separated into three primary color images of R, G and B by using corresponding color filters, and an image converter such as a CCD converts the separated color images into digital electrical signals. Because the color characteristics of the color image scanners are determined by characteristics of lighting systems, the three primary color filters and the image converters, color image scanners have different characteristics. Therefore, if the color separation signal obtained in each apparatus is directly output, the output color separation signal does not have the desired characteristics. Consequently, in the color image scanner, an operation to correct the obtained color separation signals to color separation signals having the desired characteristics is necessary.

Also, the color reproduction characteristics of a color printer are determined by the characteristics of inks, dot areas and overlap conditions, and color printers have different characteristics. Therefore, if images are produced by directly using input color separation signals, the desired color image cannot be obtained. Consequently, in the color printer, an operation to correct the obtained color R, G and B separation signals to the color R, G and B or C, M, Y separation signals or C, M, Y and K having the desired characteristics is also necessary.

When a color image scanner exclusively connects to a color printer, color correction is necessary in order to change an original color image to a desired color image.

Although a strict color correction can be carried out using the Neugebaure formula, an easier color correction using a masking formula is generally carried out. In a large scale system used in making plate for a printing machine, a high speed computer having a high throughput is used to carry out the operation, and the color correction is carried out, using signals from a drum, type scanner according to the Neugebaure formula or the masking formula. However, the operation time is excessively long. Therefore, it is difficult to use such a high throughput computer in a small DTP system, etc.

Further, a long operation time for the color correction becomes a problem because the computer can not be used only for the color correction. Therefore, a color correction circuit which can carry out a color correction operation in a short time is required even though the color correction will be limited in some points.

Two masking formulas of a linear (first-order) masking formula and a second-order masking formula are widely used. A linear masking formula is expressed by a formula (1), and a second-order masking formula is expressed in by a formula (2).

$$\begin{bmatrix} R \\ G \\ B \end{bmatrix} = \begin{bmatrix} m_{11} & m_{12} & m_{13} \\ m_{21} & m_{22} & m_{23} \\ m_{31} & m_{32} & m_{33} \end{bmatrix} \times \begin{bmatrix} r \\ g \\ b \end{bmatrix} \quad (1)$$

$$\begin{bmatrix} R \\ G \\ B \end{bmatrix} =$$

$$\begin{bmatrix} m_{11} & m_{12} & m_{13} & m_{14} & m_{15} & m_{16} & m_{17} & m_{18} & m_{19} & m_{10} \\ m_{21} & m_{22} & m_{23} & m_{24} & m_{25} & m_{26} & m_{27} & m_{28} & m_{29} & m_{20} \\ m_{31} & m_{32} & m_{33} & m_{34} & m_{35} & m_{36} & m_{37} & m_{38} & m_{39} & m_{30} \end{bmatrix} \times \begin{bmatrix} r \\ g \\ b \\ rg \\ gb \\ br \\ r^2 \\ g^2 \\ b^2 \\ 1 \end{bmatrix}$$

The operation of the linear masking formula is easier than that of the second-order masking formula. However, the correction by the linear masking formula is not sufficient for all purposes. Therefore, when color correction of a high degree is necessary, a second-order masking formula is used. The present invention relates to a color correction circuit which carries out color correction by using a second-order masking formula.

When the calculations for the second-order masking formula are carried out only by software, the operating time becomes excessively very long. Therefore, several kinds of color correction circuits and color correction methods are proposed.

A color correction circuit having the shortest operating time is a memory circuit in which three color separation signals are input as look-up table address signals, and previously calculated correction values are stored in the look-up table. In this circuit, color correction values are directly obtained by applying three color separation signals. However, this circuit has a problem that the memory requirement of this circuit is very large.

For example, when each color separation signal is eight bit data which can express 256 gradation levels, and the color correction value stored in the circuit is also eight bit data, the memory capacity of the color correction circuit is 256×256×256×3 (colors)=48 Mbyte. As the capacity of memory devices has increased in recent years, a color correction circuit having such a memory capacity may be realized. However, such a color correction circuit must be expensive. Therefore, a type of color correction circuit in which the total memory capacity can be reduced although the operation time becomes a little longer is required.

For example, Japanese Unexamined Patent Publication (Kokai) 3-66288 discloses an image processing apparatus in which values of square terms of respective color separation signals are stored in a memory to which upper one or more bits of respective color separation signals are input as address signals, and correction values corresponding to lower eliminated bits are calculated by a interpolation method.

However, the above image processing apparatus has a problem that the operation time becomes long because the operation is carried out by the interpolation method.

Further, Japanese Unexamined Patent Publication (Kokai) 2-7671 discloses a color correction apparatus which includes latches for holding respective color separation signals; memories in which color separation signals are respectively input as address signals and values of square terms of respective color separation signals are stored; memories in which pairs of two color separation signals are respectively input as address signals and product values of respective pairs of two color separation signals are stored; a memory for storing correction indices; and an accumulator. In this apparatus, a correction value can be obtained by adding values output from respective memories in response to color separation signals by the accumulator.

In this color correction apparatus, the total capacity of the memories is reduced and the operation time is comparatively short. However, this apparatus has a problem that a many kinds of memories are provided, and the accumulator is complex because a number of the outputs added by the accumulator is large.

SUMMARY OF THE INVENTION

An object of the present invention is to realize a color correction circuit in which the total o capacity of the memories is further reduced and an operation time is also reduced in comparison with the prior art.

A color correction circuit according to the present invention corrects three digital color separation signals according to a second-order color correction formula. The color correction circuit includes three latches, a first memory, a second memory, a third memory and an adder. The three latches respectively hold the three digital color separation signals. The first memory receives first and second color separation signals of the three digital color separation signals and a color selection signal as address signals, and outputs the value of the sum of some terms previously calculated by the second-order color correction formula. The second memory receives second and third color separation signals of the three digital color separation signals and the color selection signal as address signals, and outputs the value of the sum of some terms previously calculated by the second-order color correction formula. The third memory receives third and first color separation signals of the three digital color separation signals and the color selection signal as address signals, and outputs the value of the sum of some terms previously calculated by the second-order color correction formula. The adder outputs the sum of the outputs of the first, second and third memories. The value of the term including the product of the first and second color separation signals in the second-order color correction formula is included in the value in the first memory. The value of the term including the product of the second and third color separation signals in the second-order color correction formula is included in the value in the second memory. The value of a term including the product of the third and first color separation signals in the second-order color correction formula is included in the value in the third memory. Values of linear terms and terms including square of respective color separation signals in the second order color correction formula are included in memories to which related color separation signals are input.

When correction values are previously calculated and stored in a memory which receives color separation signals as address signals, the total required capacity of the memories decreases according to a decrease in the maximum number of bits in the address signal stored in each memory. In order to make the operation time shorter and the operation circuit simpler, the correction value must be obtained only by adding values output from the memories. Because the second-order masking formula has three product terms for two color separation signals, three memories which respectively store three pairs of two color separation signals are necessary in order to obtain the correction value by only adding values output from the memories. Other values of linear terms and square terms of respective color separation signals in the second-order color correction formula can be stored in memories to which related color separation signals are input, further, these values of linear terms and square terms are added and stored in memories. Therefore, when these values are stored in a form that these values are previously added to the value of the product terms of the two color separation signals, memories for storing these values of linear terms and square terms can be omitted. Further, the adder becomes simpler and the operation time becomes shorter because the number of outputs from the memories are reduced.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
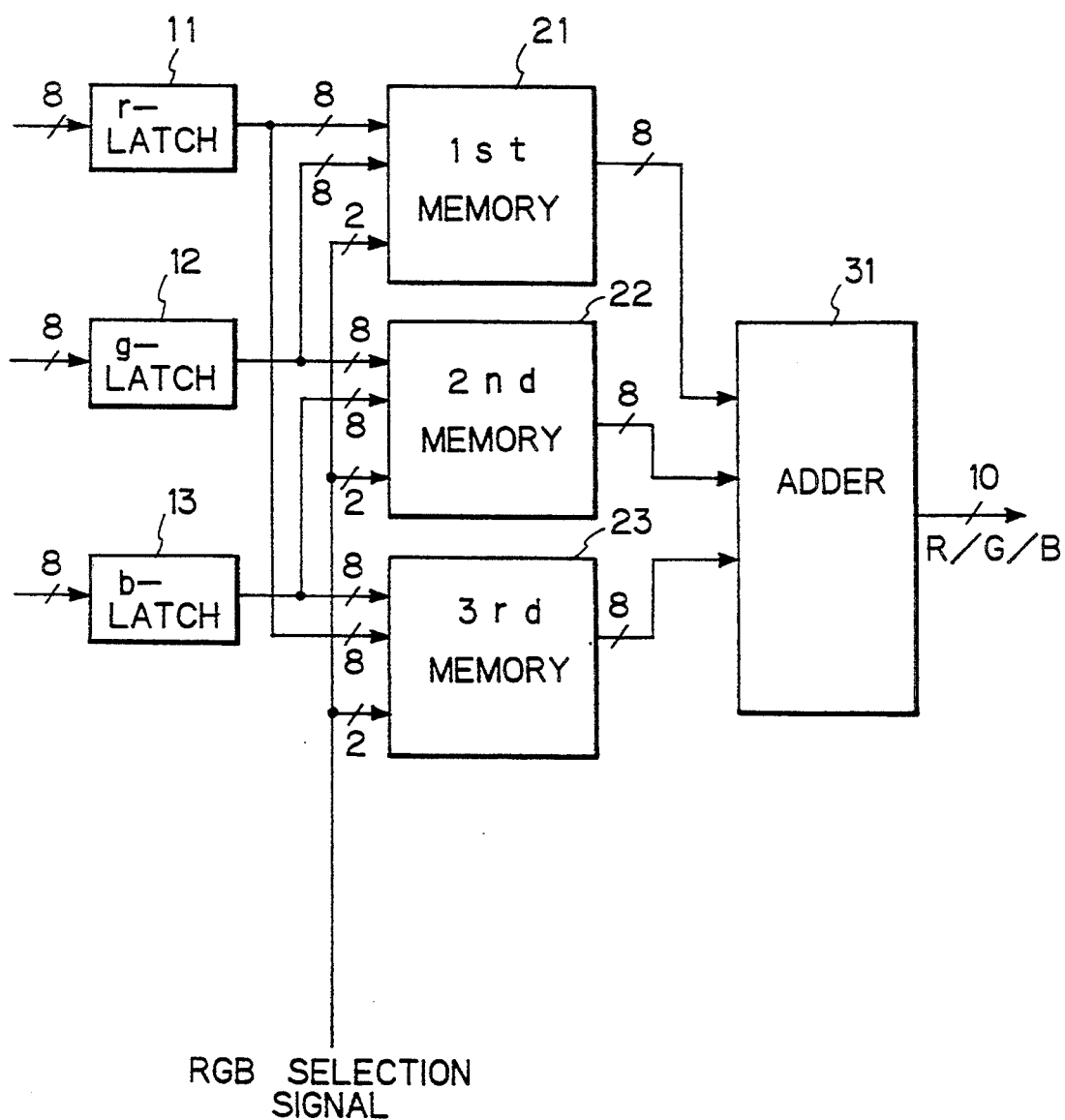
FIG. 1 is a block diagram showing a constitution of a color correction circuit of a first embodiment of the present invention.

FIG. 1 is a block diagram showing a constitution of a color correction circuit of a first embodiment of the present invention.

In FIG. 1, reference numerals 11, 12 and 3 designate latches which hold three digital color separation signals r, g, b, input from outside the device, until corrected color separation signals are obtained. A first memory 21 which receives color separation signals r, g and a color selection signal. A second memory 22 which receives color separation signals g b and a color selection signal. A third memory 23 which receives color separation signals b, r and a color selection signal. The color selection signal can have one of three values of 1, 2 or 3. When the color separation signal is "0", the corrected color separation signal is output. When the color separation signal is "1", the corrected color separation signal G is output. When the color separation signal is "2", the corrected color separation signal B is output. An adder 31 outputs a sum of the three values output from the first memory 21, the second memory 22 and the third memory 23. In the first embodiment, ROMs are used as the first, second and third memories.

Values of respective terms in the above-mentioned second-order masking formula are divided into three groups and sums of the respective groups are respectively stored in the first memory 21, the second memory 22 and the third memory 23 in look-up table forms. For example, in the first memory 2, the sum of the terms $m_{11}r$, $m_{14}rg$, $m_{17}r^2$, $m_{10}$ of the second-order masking formula is stored at an address corresponding to the values of the color separation signals r, g and the "0" color selection signal. Similarly, a sum of terms $m_{21}r$, $m_{24}rg$, $m_{27}r^2$ is stored at an address corresponding to the values of the color separation signals r,g and the "1" color selection signal, and a sum of terms $m_{31}r$, $m_{34}rg$, $m_{37}r^2$ is stored at an address corresponding to the values of the color separation signals r, g and the "2" color-selection signal.

Further, in the second memory 22, the sum of the terms $m_{12}g$, $m_{15}gb$, $m_{18}g^2$ of the second-order masking formula is stored at an address corresponding to the values of the color separation signals g, b and the "0" color selection signal. Similarly, the sum of the terms $m_{22}g$, $m_{25}gb$, $m_{28}g^2$ $m_{20}$ is stored at an address corresponding to the values of the color separation signals g,b and the "1" color selection signal, and the sum of the terms $m_{32}g$, $m_{35}gb$, $m_{38}g^2$ is stored at an address corresponding to the values of the color separation signals g, b and the "2" color selection signal. Further, in the third memory 23, the sum of the terms $m_{13}b$, $m_{16}br$, $m_{19}b^2$ of the second-order masking formula is stored at an address corresponding to the values of the color separation signals b, r and the "0" color selection signal. Similarly, the sum of the terms $m_{23}b$, $m_{26}br$, $m_{29}b^2$ is stored at an address corresponding to the values of the color separation signals b, r and the "1" color selection signal, and the sum of the terms $m_{33}b$, $m_{36}br$, $m_{39}b^2$, $m_{30}$ is stored at an address corresponding to the values of the color separation signals b, r and the "2" color selection signal.

Consequently, for example, when the color selection signal is "1" and the color separation signals are $r_n$, $g_n$, $b_n$, the first memory 21 outputs a value of $m_{21}r_n + m_{24}r_ng_n + m_{27}r_n^2$, the second memory 22 outputs a value of $m_{22}g_n + m_{25}g_nb_n + m_{28}g_n^2 + m_{20}$, the third memory 23 outputs a value of $m_{23}b_n + m_{26}b_nr_n + m_{29}b_n^2$. The adder 31 adds these outputs, then, a green corrected value of the second-order masking formula.

While the latches hold the input color separation signals r, g and b, the correction values R, G and B can be obtained by sequentially changing the color selection signal.

FIGS. 2A through 2J are time charts showing these operations.

As shown in FIGS. 2A through 2J, while the color separation signals r, g, b are latched, memories output partial sums of terms $m_{10}$ through $m_{19}$, and the correction value R is obtained by adding these outputs in the adder. Further, while the latched color separation signals r, g, b are held, the correction values G and B are obtained by sequentially changing the color selection signal to "1" and "2".

In the first embodiment, values of linear terms and terms including square of respective color separation signals are added to the sums stored in the memories in a form described above, however, other forms can be made available. Namely, the respective values of linear terms and square terms can be added to sums output from memories to which related color separation signals are input. Further, each constant term can be added to every sum output from the memories. For example, in the first embodiment, terms $m_{11}r$, $m_{17}r^2$, $m_{10}$ can be stored in a form that they can be added to the sum of terms $m_{13}b$, $m_{16}br$, $m_{19}b^2$ stored in the third memory 23.

In the circuit of FIG. 1, when a number of data bits of each memory is eight, a total capacity of the three memories is 590 kbyte ($2^{16} \times 3 \times 3$) because a number of bits for each color separation signal is eight and the color selection signal can be in three states.

As described above, when a memory receives three color separation signals as address signals, the required capacity of the memory is 48 Mbyte. Therefore, it is apparent that the required capacity is reduced in the first embodiment. Further, in comparison with a color correction apparatus disclosed in Japanese Unexamined Patent Publication (Kokai) 2-7671, memories to store values of square terms and a memory to store correction indices are eliminated, and the constitution of the adder becomes simpler and the operating speed of the adder becomes faster because the adder adds only three inputs.

In the first embodiment, the memories 21, 22, 23 to dividedly store the correction values of the masking formula are realized by Read Only Memories (ROMs) because the capacity of the ROM is generally larger than those of other memory devices and the cost per bit is lower than those of the other memory devices. However, because the total capacity of the memories is reduced according to the present invention, the circuit shown in FIG. 1 can be realized by using other memory devices such as Static Random Access Memories (SRAMs). When the circuit is realized by using the memory devices such as SRAMs which are rewritable, the contents of the memories are changable.

When apparatuses used in a system are changed or the reproduction color needs to be changed, values of the indices of the second-order color correction formula must be changed. When the memories are realized by the ROMs, the ROMs are replaced with other ones to change the values of indices of the formula, namely, the system using ROMs is not flexible. However, when rewritable memories are used, the system becomes flexible. A second embodiment is an example using SRAMs.

Figure 3:
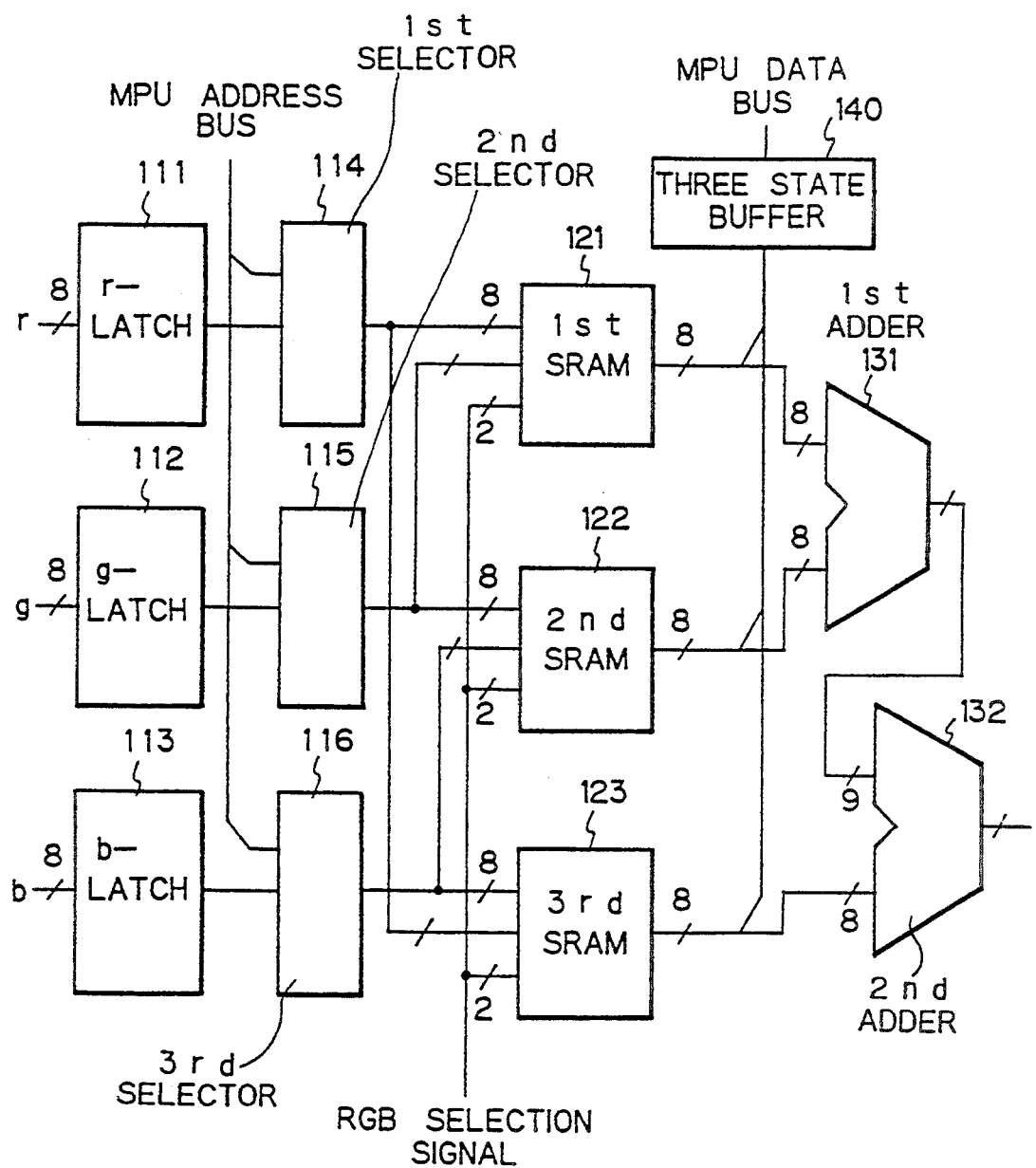
FIG. 3 is a block diagram showing a constitution of a color correction circuit of a second embodiment of present invention.

FIG. 3 is a block diagram showing the constitution of a color correction circuit of the second embodiment.

In FIG. 3, reference numerals 111,112 and 113 designate latches. 114, 15 and 116 designate selectors each of which switches address signals input to the memories between color separation signals output from the latches and address signals from a microcomputer. 121, 122 and 123 designate SRAMs which dividedly store correction values for the masking formula. 131 and 132 designate adders. 120 designates a three state buffer.

In the second embodiment, the SRAMs are used as memories which store corrected values of the masking formula, therefore, contents of the SRAMs can be changed from outside via the selectors 11, 115, 116 and the three state buffer 10. In this way, the correction formula is always changable. The contents stored in the SRAMs 121, 122, 123 are same as those in the first embodiment.

Further, in the second embodiment, only the upper five bits of the color separation signal G are input to the SRAM 121. Similarly, the upper five bits of the color separation signals B, R are respectively input to the SRAM 122, 123. Each color separation signal is normalized at "1", therefore, the product of two color separation signals becomes smaller than the values of the respective color separation signals. As described in the first embodiment, the color separation signal G contributes a value stored in the first memory 121 only in a form of a product with the color separation signal R, namely, the contribution ratio of the color separation signal G is low in the first memory. Therefore, although three lower bits of the color separation signal G are eliminated, the accuracy of the operation is not reduced. In the same way, the eliminations of lower three bits of the color separation signals B, R input to the second and third memories do not reduce the accuracy of the operation. By eliminating the lower three bits of each color separation signal as shown in FIG. 3, the capacity of the memories can be reduced to ⅛ of the first embodiment.

Further, although the adder of the first embodiment has three inputs, two adder each of which has two inputs are used in the second embodiment.

The first and second embodiments are described above, however, there can be modifications to the present invention. For example, the constant terms of the masking formula are not added to values in the memories, but are stored in a register. Then, they are supplied in response to the color selection signal.

Further, the color separation signals are red, green and blue in the embodiments, however, they can be cyan, magenta and yellow.

In the following, an example is given in which a color correction circuit of the present invention is applied to a color image scanner.

Figure 4:
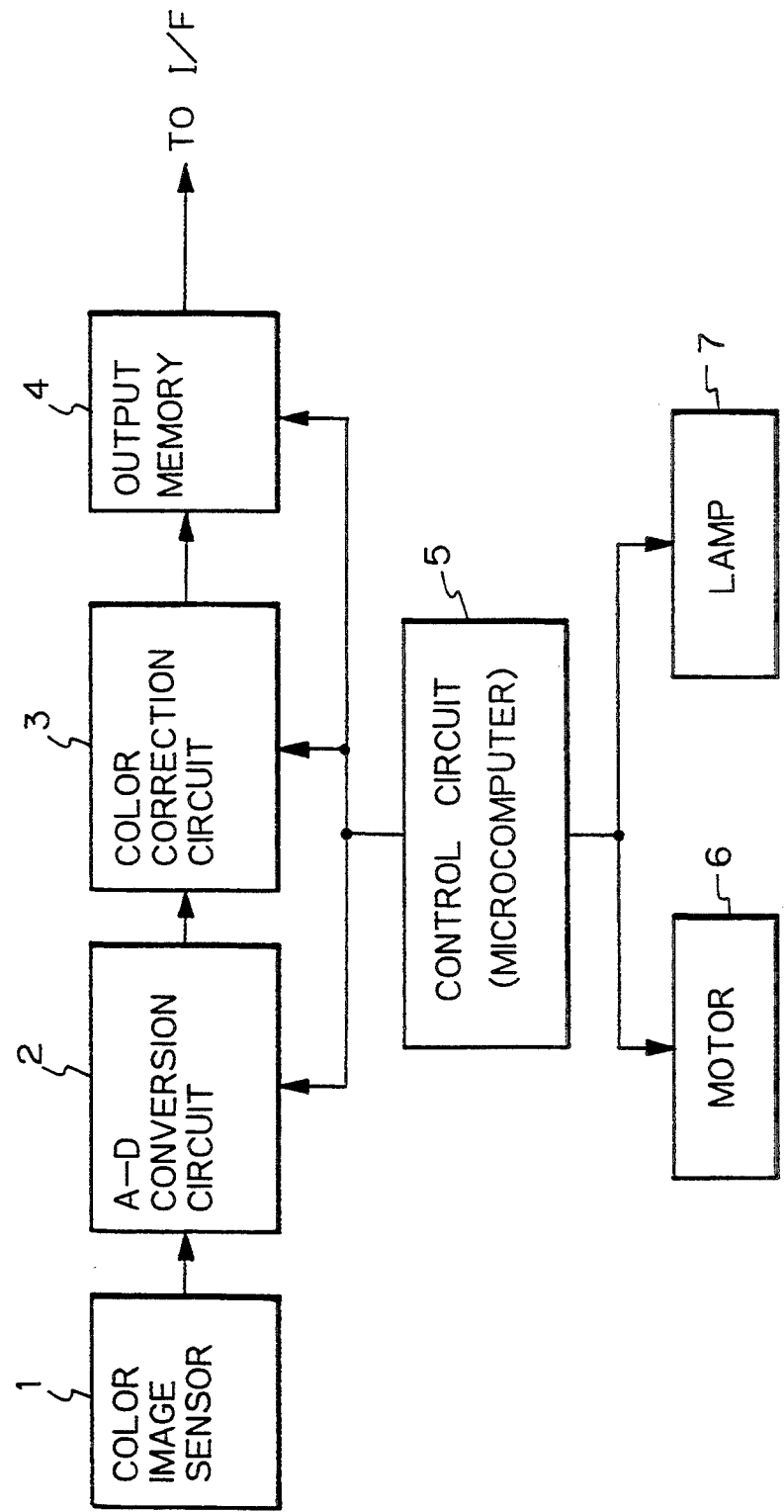
FIG. 4 is a block diagram showing a total constitution of a color image scanner to which the present invention applied.

FIG. 4 is a block diagram showing a color image scanner having a color correction circuit of the present invention.

In FIG. 4, reference numeral 1 designates a color image sensor which converts image light reflected from an original into electrical signals corresponding to three colors R, G and B. For example, the color image sensor can be realized by a CCD (Charge Coupled Device). An Analog-to-Digital (A-D) 2 conversion circuit converts the outputs of the color image sensor 1 into digital signals. A color correction circuit 3 corrects output image signals of the A-D conversion circuit 2 into signals having appropriate color characteristic. The color correction circuit 3 is either of the circuits of the first or second embodiments. A memory 4 is used to resolve a timing difference between a scan timing of the color image sensor 1 and an output timing of an interface. Reference numeral 115 designates a control circuit. A motor 6 which relatively moves the color image sensor 1 or the original. The color image sensor 1 reads the original synchronously. A lamp 7 for illuminating the original. The motor 6 and the lamp 7 are controlled by the control circuit 5.

Figure 2:
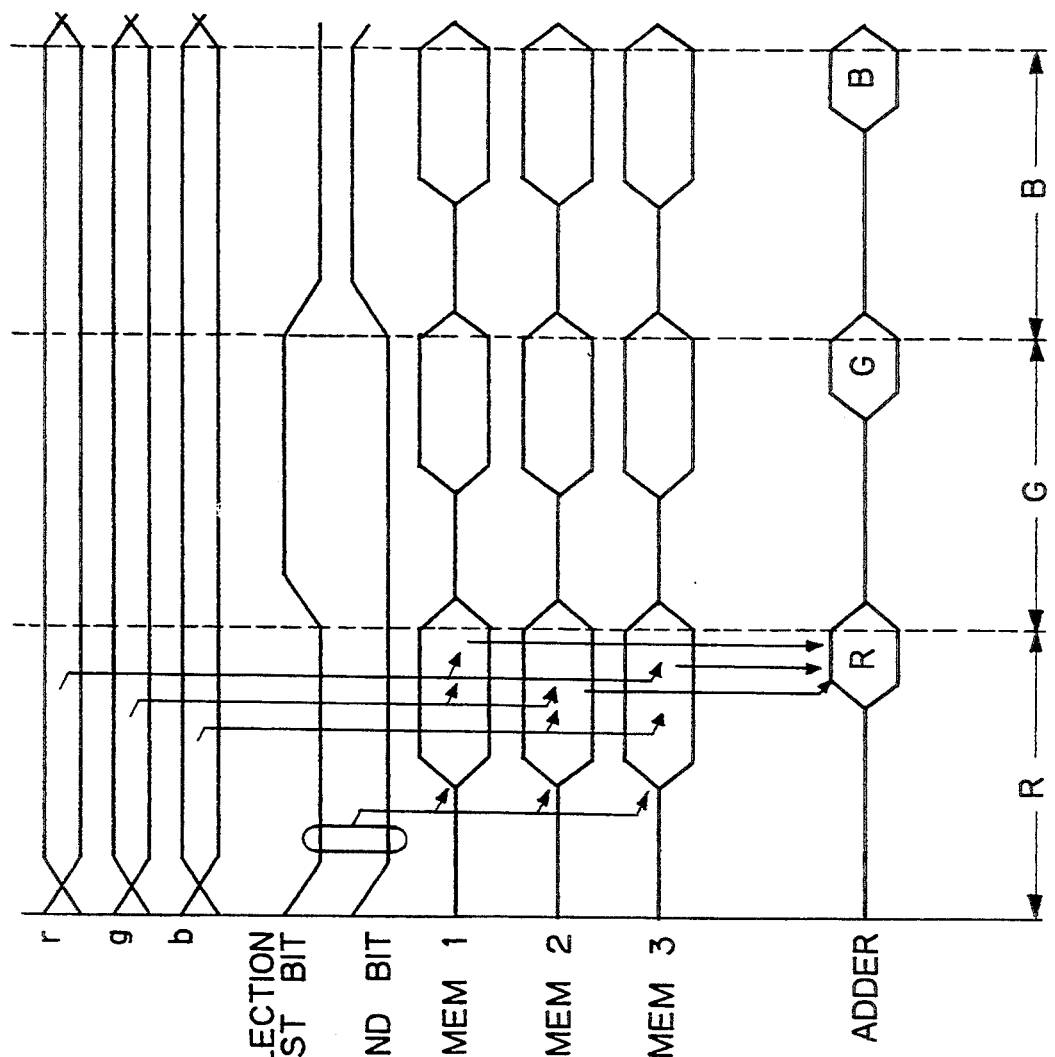
FIGS. 2A through 2J are time charts showing operations of the color correction circuit of the first embodiment.
Figure 5:
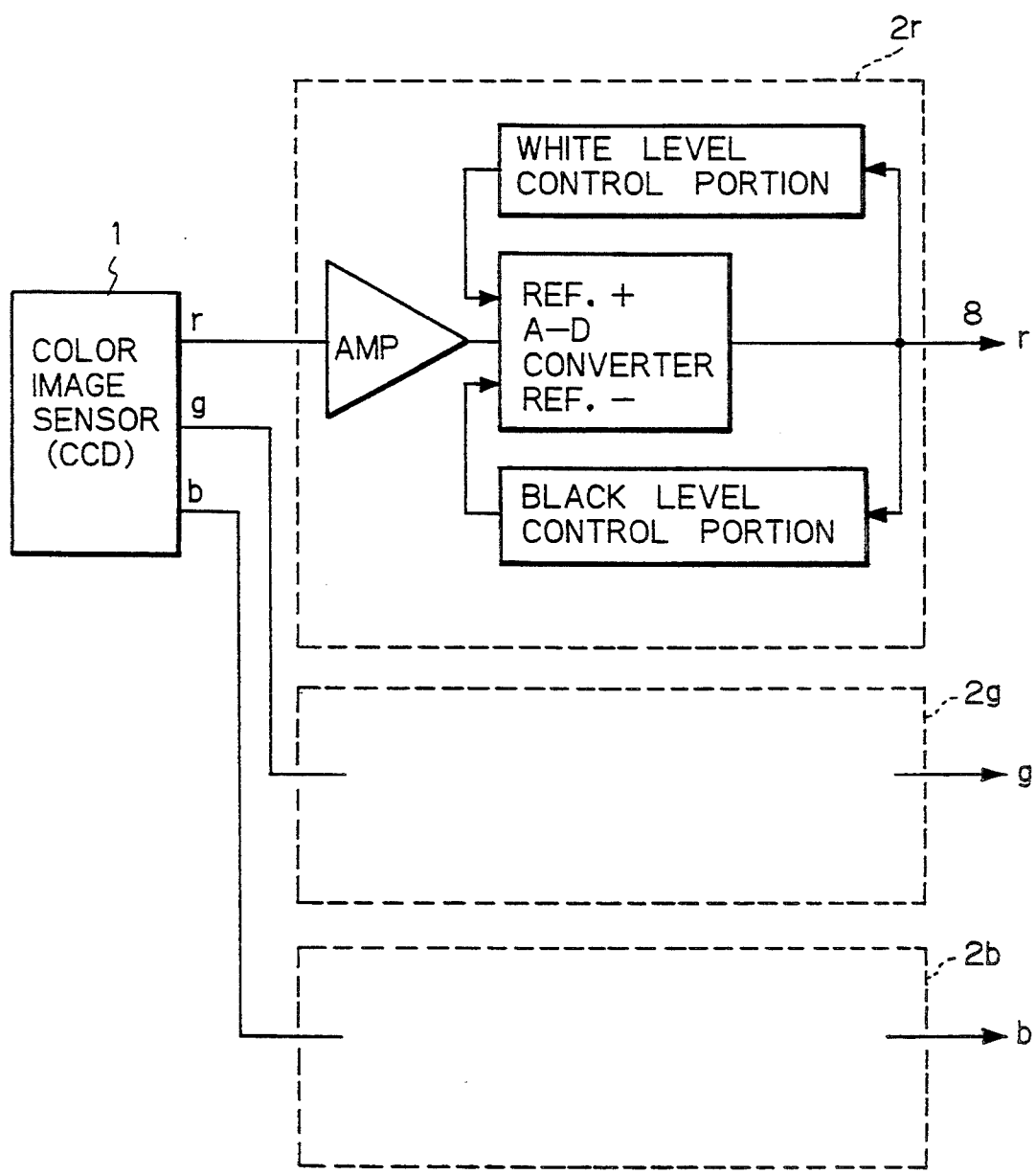
FIG. 5 is a block diagram showing a constitution of an analog-to-digital converting circuit to convert an analog signal output from a color image sensor into a digital signal in the color image scanner of FIG. 4

FIG. 5 is a block diagram showing the constitution of the color image sensor 1 and the A-D conversion circuit 2 of FIG. 2. These devices are well-known, therefore, detailed explanations are omitted and only outlines are described.

The color image sensor 1 provides filters at a light receiving portion, and the filters respectively transmit red, green and blue light. The color image sensor 1 outputs analog color separation signals in proportion to intensities of respective colors of the reflected light.

The A-D conversion circuits 2 are respectively provided for the three color signals. In the A-D conversion circuit 2, an amplifier circuit AMP at a first stage converts the input signal to a signal having a voltage appropriate to an A-D converter. Reference voltages from a white level portion and a black level portion are input to reference voltage input terminals of the A-D converter. By these reference voltages, the A-D converter is adjusted so that maximum and minimum outputs of the A-D converter respectively correspond to outputs of when a white reference plate and a black reference plate are read. For example, when the output of the A-D converter is 8-bits, an output of hexadecimal FF corresponds to the white reference plate and an output of hexadecimal $00_H$ corresponds to the black reference plate. In this way, non-uniformities of sensitivity of the color image sensor 1 are corrected.

Figure 6:
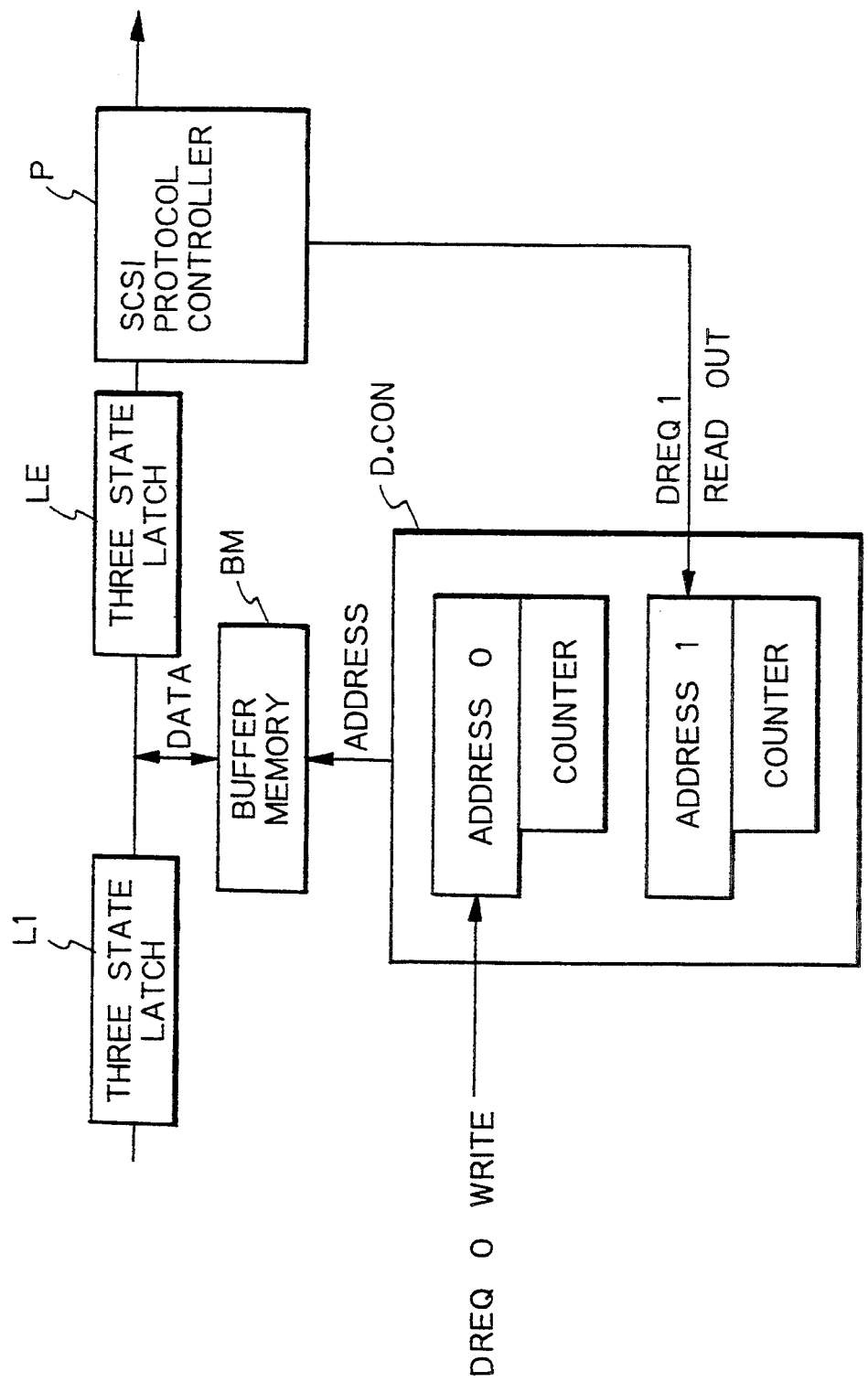
FIG. 6 is a block diagram showing a constitution of an output circuit to output corrected image signals in the color image scanner of FIG. 4

FIG. 6 is a block diagram showing a constitution of a circuit which is used to synchronize generation and output of the corrected color signals. This circuit provides a buffer memory BM and a Direct Memory Access (DMA) Controller D.Con.

The color image sensor 1 sequentially outputs signals for a line in synchronization with a constant clock signal. On the contrary, a SCSI interface is a standard interface which carries out transfer by a hand-shake method. Therefore, the generation and the output of the corrected signals are not synchronous. Therefore, the buffer memory is necessary.

Particularly, when the movement of the color image sensor 1 is controlled by a through-up and through-down method, the buffer memory further improves the transfer efficiency. In this application example, writings into the buffer memory are always carried out in synchronization with the operation of the color image sensor 1, and outputting from the buffer memory is carried out using a cycle-steal mode.

As described above, according to the present invention, a color correction circuit which corrects color separation signals according to the second-order masking formula can be realized with a memory capacity less than those of prior art color correction circuits. Therefore, the color correction circuit can be provided in low price systems such as a color image scanner, a color printer, etc., and the color reproduction qualities of these systems can be improved.

I claim:

1. A color signal correction circuit for correcting three digital color separation signals according to a second-order color correction formula having terms, comprising:

first, second and third latches respectively holding said three digital color separation signals;

a first memory receiving first and second color separation signals of said three digital color separation signals and a color selection signal as address signals, and outputting a first value, which is a sum of a first group of terms;

a second memory receiving second and third color separation signals of said three digital color separation signals and said color selection signal as address signals, and outputting a second value, which is a sum of a second group of terms;

a third memory receiving third and first color separation signals of said three digital color separation signals and said color selection signal as address signals, and outputting a third value, which is a sum of a third group of terms; and an adder outputting a sum of first, second, and third values received from said first, second and third memories, said first group of terms including the product of said first and second color separation signals in said second-order color correction formula, said second group of terms including the product of said second and third color separation signals in said second-order color correction formula, said third group of terms including the product of said third and first color separation signals in said second-order color correction formula, and values of linear terms and square terms of respective color separation signals in said second-order color correction formula being included in said output from first, second and third memories to which related color separation signals are input.

2. A color signal correction circuit as set forth in claim 1, wherein said circuit comprises a fourth memory for outputting each constant term of said three digital color separation signals according to said color selection signal.

3. A color signal correction circuit as set forth in claim 1, wherein the number of bits of said second color separation signal input to said first memory is less than that of said second color separation signal input to said second latch.

4. A color signal correction circuit as set forth in claim 1, wherein the number of bits of said third color separation signal input to said second memory is less than that of said third color separation signal input to said third latch.

5. A color signal correction circuit as set forth in claim 1, wherein the number of bits of said first color separation signal input to said third memory is less than that of said first color separation signal input to said first latch.

6. A color signal correction circuit as set forth in claim 1, wherein said first, second and third memories are rewritable random access memories, and the contents of said rewritable random access memories are changeable from outside said circuit.

* * * * *

UNITED STATES PATENT AND TRADEMARK OFFICE
CERTIFICATE OF CORRECTION

PATENT NO. : 5,426,596
DATED : June 20, 1995
INVENTOR(S) : Nobuo OGAWA

It is certified that error appears in the above-indentified patent and that said Letters Patent is hereby corrected as shown below:

Col. 3, line 39, delete "o".

Col. 5, line 12, after "signal" insert --R--.

Col. 6, line 67, change "15" to --115--.

Col. 7, line 10, change "11" to --114--;
line 11, change "10" to --140--.

Col. 8, line 29, change "FF" to --$FF_H$--.

Signed and Sealed this

Twenty-sixth Day of September, 1995

Attest:

BRUCE LEHMAN

Attesting Officer        Commissioner of Patents and Trademarks